US012711939B2

(12) United States Patent
Lim

(10) Patent No.: US 12,711,939 B2
(45) Date of Patent: Aug. 18, 2026

(54) ACTIVE NOISE CONTROL APPARATUS FOR A VEHICLE AND A CONTROL METHOD THEREFOR

(71) Applicant: HYUNDAI MOBIS CO., LTD., Seoul (KR)

(72) Inventor: Hyung Sub Lim, Suwon-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 198 days.

(21) Appl. No.: 18/636,380

(22) Filed: Apr. 16, 2024

(65) Prior Publication Data

US 2024/0371352 A1 Nov. 7, 2024

(30) Foreign Application Priority Data

May 3, 2023 (KR) ........................ 10-2023-0057488

(51) Int. Cl.
*G10K 11/178* (2006.01)

(52) U.S. Cl.
CPC .. *G10K 11/17823* (2018.01); *G10K 11/17825* (2018.01); *G10K 11/17883* (2018.01); *G10K 2210/12821* (2013.01); *G10K 2210/3026* (2013.01); *G10K 2210/3027* (2013.01); *G10K 2210/501* (2013.01)

(58) Field of Classification Search
CPC ....... G10K 11/17823; G10K 11/17825; G10K 11/17883; G10K 2210/12821; G10K 2210/3026; G10K 2210/3027; G10K 2210/501
USPC ........................................................ 381/74.1
See application file for complete search history.

(56) References Cited

U.S. PATENT DOCUMENTS 10,741,162 B1 * 8/2020 Bastyr .............. G10K 11/17817
2004/0247137 A1 * 12/2004 Inoue ............... G10K 11/17854 381/71.4
2021/0323562 A1 10/2021 You et al.

FOREIGN PATENT DOCUMENTS

CN 110688956 A 1/2020
JP 404234096 A 8/1992

OTHER PUBLICATIONS

European Office Action dated Sep. 16, 2024 issued in corresponding European Application No. 24172634.8.

* cited by examiner

*Primary Examiner* — Vivian C Chin
*Assistant Examiner* — Douglas J Suthers
(74) *Attorney, Agent, or Firm* — NovTechIP International PLLC

(57) ABSTRACT

An active noise control method for a vehicle including: acquiring frequency section information corresponding to a current state of the vehicle from a lookup table that has previously stored combination information for each frequency section of a plurality of acceleration sensors for each of state variables of the vehicle; generating a virtual reference signal from reference signals of the plurality of acceleration sensors on the basis of the frequency section information; generating an active noise control signal on the basis of the virtual reference signal and an error signal; and outputting an active noise control sound based on the active noise control signal.

5 Claims, 4 Drawing Sheets

ACTIVE NOISE CONTROL APPARATUS FOR A VEHICLE AND A CONTROL METHOD THEREFOR

CROSS-REFERENCE TO RELATED APPLICATIONS

The present application claims the benefit under 35 USC § 119 (a) of Patent Application No. 10-2023-0057488, filed on May 3, 2023, in Korea, the entire disclosure of which is incorporated herein by reference for all purposes.

TECHNICAL FIELD

The present disclosure relates to an active noise control apparatus for a vehicle and a control method therefor.

BACKGROUND

The content described in this section simply provides background information for the present disclosure and does not necessarily constitute related art.

Active noise control refers to control for blocking surrounding noise. Specifically, in the active noise control, surrounding noise is received by using a sound reception apparatus such as a microphone. Noise is eliminated by generating an opposite canceling wave (anti-noise) for canceling out the received surrounding noise.

An active noise control method for a vehicle may electronically control a phase of noise. For example, an acceleration sensor receives a road noise signal and generates a transfer function between the acceleration sensor and a microphone. The active noise control is performed on the basis of coherence which is a correlation of the generated transfer function, that is, a correlation in a frequency domain.

In an active noise control method of the related art, an active noise control signal is calculated on the basis of coherence of one acceleration sensor with the highest transfer function correlation among a plurality of acceleration sensors. In the active noise control method of the related art, since the active noise control signal is calculated on the basis of a single coherence value, performance of an active noise control apparatus is degraded.

SUMMARY

An active noise control apparatus for a vehicle and a control method therefor according to an embodiment can improve performance of an active noise control technology for a vehicle by calculating a virtual reference signal by applying multiple correlation analysis.

The active noise control apparatus for a vehicle and a control method therefor according to an embodiment can reduce an installation cost of components for improving active noise performance.

The problems to be solved by the present invention are not limited to the problems mentioned above, and other problems not mentioned may be clearly understood by those skilled in the art from the description below.

According to an embodiment, the active noise control apparatus for a vehicle and a control method therefor have an effect that it is possible to improve performance of an active noise control technology for a vehicle by calculating a virtual reference signal by applying multiple correlation analysis.

According to an embodiment, the active noise control apparatus for a vehicle and a control method therefor have an effect that it is possible to reduce an installation cost of components for improving active noise performance.

DETAILED DESCRIPTION

Figure 1:
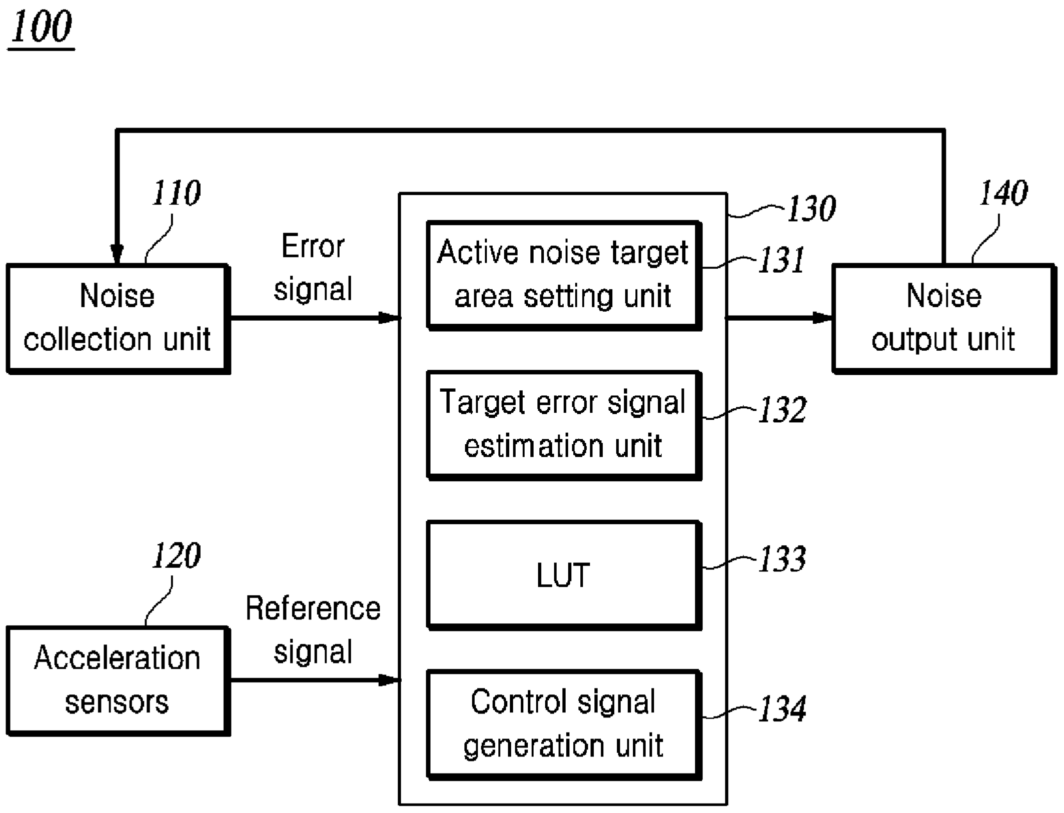
FIG. 1 is a block configuration diagram illustrating a configuration of an active noise control apparatus for a vehicle according to the present disclosure.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit', 'module', and the like refer to one or more units for processing at least one function or operation, which may be implemented by hardware, software, or a combination thereof.

FIG. 1 is a block diagram illustrating a configuration of an active noise control apparatus for a vehicle according to an embodiment of the present disclosure.

Referring to FIG. 1, an active noise control apparatus 100 for a vehicle includes some or all of a noise collection unit 110, acceleration sensors 120, an active noise control unit 130, and a noise output unit 140.

The noise collection unit 110 includes a sound collection apparatus such as a microphone. For example, the noise collection unit 110 collects noise information generated from the inside and outside of the vehicle. The noise collection unit 110 is disposed inside the vehicle. There are a plurality of noise collection units 110. The noise collection unit 110 may be disposed in some or all of a center fascia of the vehicle, a steering wheel of the vehicle, a ceiling inside the vehicle, and a headrest of each seat.

The acceleration sensors 120 measure road noise of the vehicle. The acceleration sensors 120 generate reference signals on the basis of the measured road noise of the vehicle. The acceleration sensors 120 include a plurality of acceleration sensors.

The acceleration sensor is located on a transfer path for a vibration generated in the vehicle. The acceleration sensor measures a vibration that causes road noise. The acceleration sensor senses noise and a vibration generated from wheels of the vehicle that moves on a road. Here, the acceleration sensor may be mechanically coupled to components such as a suspension apparatus of the vehicle or a chassis of the vehicle.

The acceleration sensors 120 generate a transfer function with the noise collection unit 110. For example, the acceleration sensors 120 transfer a reference signal to the noise collection unit 110 disposed inside the vehicle. The transfer function between the acceleration sensors 120 and the noise collection unit 110 represents a correlation between the reference signal of the acceleration sensors 120 and the error signal that can be measured by the noise collection unit 110.

Figure 2:
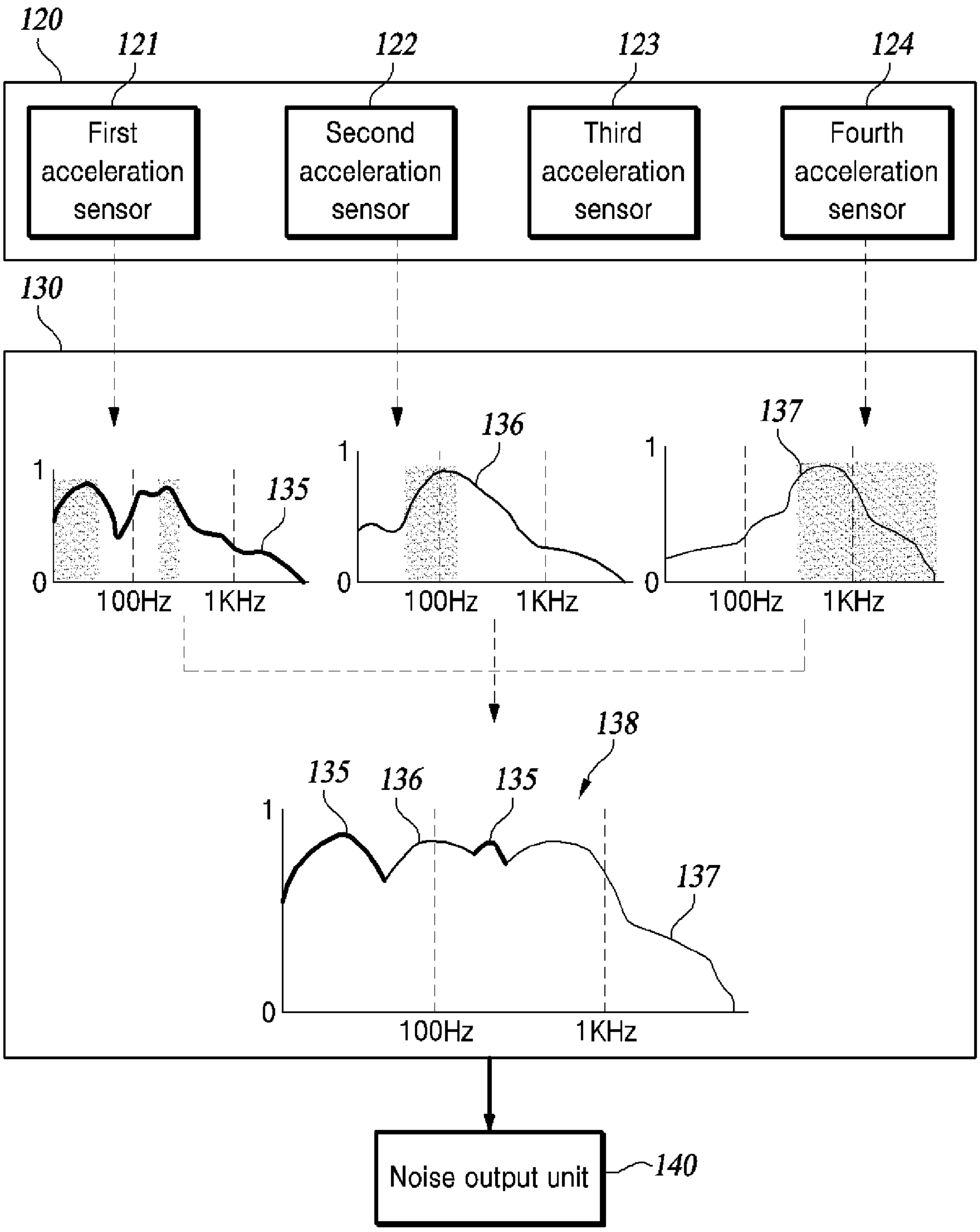
FIG. 2 is a block configuration diagram briefly illustrating an active noise control process for calculating a virtual reference signal according to an embodiment of the present disclosure.

FIG. 2 is a block configuration diagram briefly illustrating an active noise control process of calculating a virtual reference signal according to an embodiment of the present disclosure.

Referring to FIG. 2, the active noise control unit 130 generates an active noise control signal based on the information received from the noise collection unit 110 and the acceleration sensors 120.

The active noise control unit 130 includes an active noise target area setting unit 131, a target error signal estimation unit 132, a lookup table 133, and a control signal generation unit 134.

The active noise target area setting unit 131 sets an active noise target area defined through a predetermined experiment. That is, the active noise target area of the present invention is set with an area corresponding to an ear of the occupant that have boarded the vehicle as a reference. Accordingly, the active noise target area setting unit sets a target area in which the active noise control is to be performed among a plurality of active noise target areas defined through a predetermined experiment.

The target error signal estimation unit 132 selects combination information for each frequency section corresponding to a target area previously stored in the lookup table 133, for the active noise target area set by the active noise target area setting unit 131. The target error signal estimation unit 132 estimates the error signal of the target area by using the selected combination information for each frequency section. That is, the target error signal estimation unit 132 may estimate an error signal in the active noise target area using the lookup table 133 with the transfer function including an error signal between the acceleration sensors 120 and the noise collection unit 110 as a reference.

The lookup table 133 according to an embodiment of the present invention includes combination information of a section with the highest coherence with a frequency domain as a reference among the reference signals generated by the plurality of acceleration sensors 120. Here, the coherence is derived by extracting a case with the highest correlation in the frequency domain between the reference signal measured by the acceleration sensors 120 and the error signal collected by the noise collection unit 110.

When a reference signal is generated, the coherence values of the plurality of acceleration sensors 120 may be determined by comparing sensing values measured and received by the plurality of acceleration sensors 120 and the noise collection unit 110.

$$C_{xy} = \frac{S_{xy}(f)}{\sqrt{S_{xx}(f)}\sqrt{S_{yy}(f)}} \quad \text{[Equation 1]}$$

The coherence is calculated on the basis of a Pearson correlation coefficient. The coherence value is a value obtained by implementing a correlation between two signals such as an X signal and a Y signal in a frequency domain.

Referring to Equation 1, Cxy denotes the coherence between the X signal and the Y signal. Sxx and Syy are standard deviations (Power Spectral Densities) for each frequency of the X and Y signals. Sxy is covariance (Cross Spectral Density) for each frequency of the X and Y signals. Here, the covariance represents a correlation between two random variables in terms of direction and magnitude.

The noise output unit 140 includes a plurality of speakers disposed within the vehicle. The plurality of speakers are disposed in some or all of a headrest of each seat, a ceiling inside the vehicle, an inner door included in a side of each seat, and a dashboard of the vehicle.

The plurality of acceleration sensors 120 may be disposed adjacent to wheels FR, FL, RR, and RL of the vehicle.

All of the plurality of acceleration sensors 120 may be three-axis acceleration sensors. The 3-axis acceleration sensor measures acceleration values in an X-axis direction, a Y-axis direction, and a Z-axis direction. The acceleration values are measured in the X-axis direction, the Y-axis direction, and the Z-axis direction of the acceleration sensor, respectively. Each of the plurality of acceleration sensors 120 measures different acceleration values in the X-axis direction, the Y-axis direction, and the Z-axis direction on the basis of an environment in which the acceleration sensors 120 are attached to the vehicle, a vibration transfer path, and the like. Accordingly, different acceleration values are measured on the basis of the environment in which the plurality of acceleration sensors 120 disposed in the vehicle are attached, the vibration transfer path, and the like. Here, the acceleration value may include a road noise signal.

The lookup table 133 stores a combination of bandwidths with a high degree of matching between actual noise and a measured actual noise value in the coherence values of the plurality of acceleration sensors 120. The bandwidths with the high degree of matching between the actual noise and the measured actual noise value are, for example, bandwidths close to 1.

The target error signal estimation unit 132 selects a bandwidth with a high degree of matching between the road noise signal measured from the plurality of acceleration sensors 120 and the measured noise signal, by using the lookup table 133.

The active noise control method for a vehicle according to an embodiment of the present invention may include selecting any one of the three-axis direction coherence values of the plurality of acceleration sensors 120. For example, when the number of acceleration sensors 120 is n (n is a positive integer), 3$n$ coherence values are calculated. When the number of acceleration sensors 120 is 4, 12 coherence values may be calculated. Accordingly, 12 coherence values may be calculated for each microphone included in the plurality of noise collection units 110. Further, when the number of noise collection units 110 is, for example, 4, 48 coherence values may be calculated. Therefore, in an embodiment of the present invention, the frequency bandwidths of each coherence with the highest correlation between the road noise signal and the actual noise signal among the 48 coherence values may be combined so that a virtual reference signal 138 can be calculated.

In the case of the embodiment disclosed in FIG. 2, the target error signal estimation unit 132 selects three acceleration sensors such as a first acceleration sensor 121, a second acceleration sensor 122, and a fourth acceleration sensor 124 from among four acceleration sensors. Although a case in which the acceleration sensors 120 include the first to fourth acceleration sensors 121 to 124 has been illustrated in FIG. 2, this is only an embodiment, and the larger number of acceleration sensors may be included in another embodiment.

The target error signal estimation unit 132 selects combination information previously stored in the lookup table 133. For example, the target error signal estimation unit 132 selects the virtual reference signal 138, which is combination information for a sum for each frequency section with high correlation among frequency sections in the X-axis direction, the Y-axis direction, and the Z-axis direction measured by the first acceleration sensor 121, the second acceleration sensor 122, and the fourth acceleration sensor 124. Here, one coherence value with the highest degree of matching with the actual noise value in the load noise signals in the X-axis direction, the Y-axis direction, and the Z-axis direction measured by the first acceleration sensor 121 is an average value of the reference signal 135 of the first section in the frequency domain. One coherence value with the highest degree of matching with the actual noise value in the load noise signals in the X-axis direction, the Y-axis direction, and the Z-axis direction measured by the second acceleration sensor 122 is an average value of the reference signal 136 of the second section in the frequency domain. One coherence value with the highest degree of matching with the actual noise value in the load noise signals in the X-axis direction, the Y-axis direction, and the Z-axis direction measured by the fourth acceleration sensor 124 is an average value of the reference signal 137 of the third section in the frequency domain.

According to an embodiment of the present invention, the active noise control unit 130 calculates the virtual reference signal 138 on the basis of the selected bandwidth of each of the first acceleration sensor 121, the second acceleration sensor 122, and the fourth acceleration sensor 124. Specifically, the target error signal estimation unit 132 selects, from the lookup table 133, combination information in which bandwidths with a high correlation, that is, bandwidths close to 1 in the frequency domain in the reference signal 135 of the first section, the reference signal 136 of the second section, and the reference signal 137 of the third section are combined.

The control signal generation unit 134 generates a control signal for the active noise target area using the virtual reference signal 138 estimated by the target error signal estimation unit 132. Here, the control signal may include information on an active noise control sound.

Figure 3:
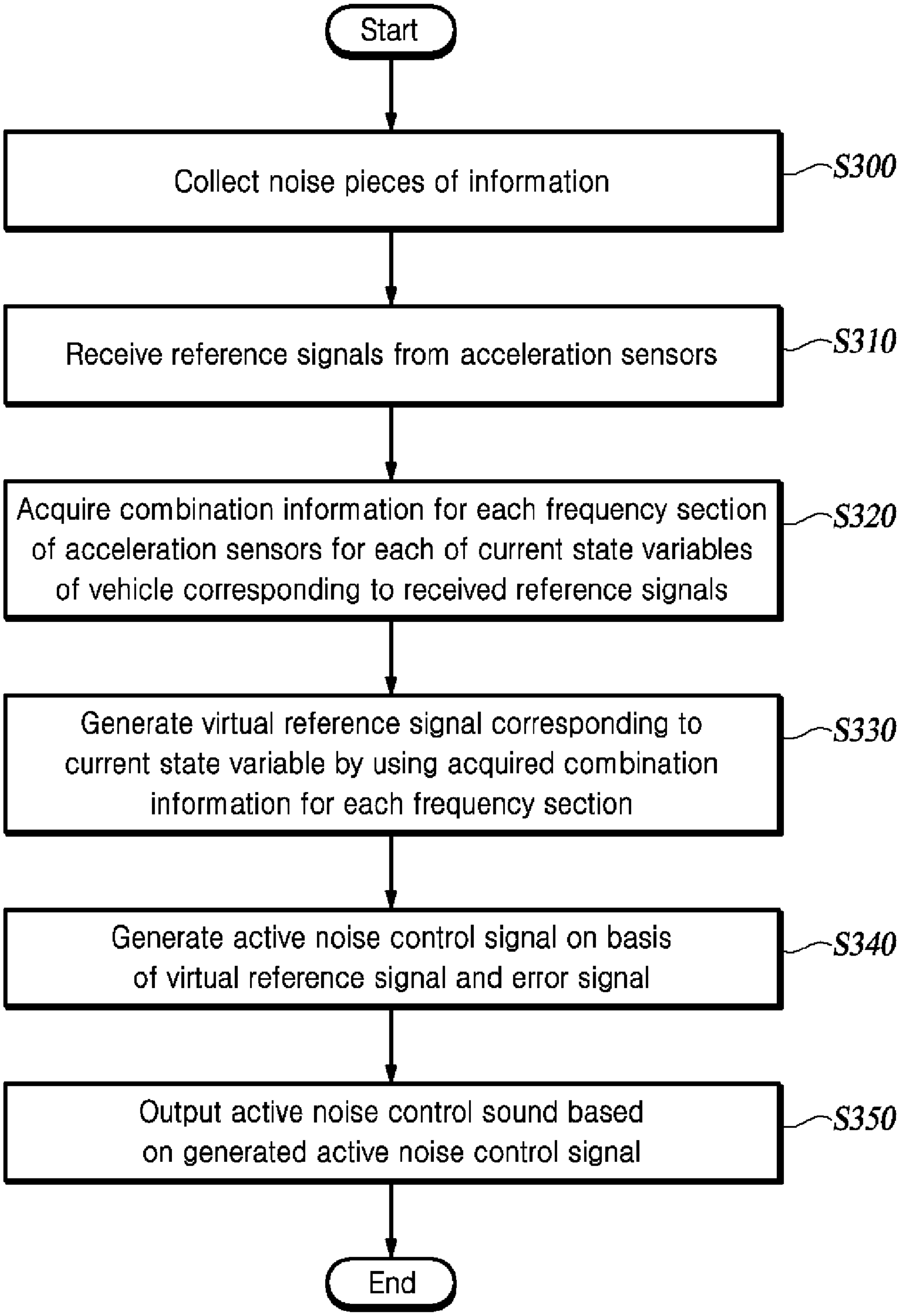
FIG. 3 is a flowchart illustrating an active noise control method for a vehicle according to an embodiment of the present disclosure.

FIG. 3 is a flowchart illustrating an active noise control method for a vehicle according to an embodiment of the present disclosure.

Referring to FIG. 3, noise information is collected (S300). The noise collection unit 110 may collect noise information generated from the inside and outside of the vehicle.

The reference signals are received from the plurality of acceleration sensors 120 (S310).

The combination information for each frequency section of the plurality of acceleration sensors 120 is acquired for each of current state variables of the vehicle corresponding to the received reference signals (S320).

The virtual reference signal 138 corresponding to the current state variable of the vehicle is generated by using the acquired combination information for each frequency section (S330).

The active noise control signal is generated on the basis of the virtual reference signal 138 and the error signal (S340).

The active noise control sound based on the generated active noise control signal is output (S350).

Figure 4:
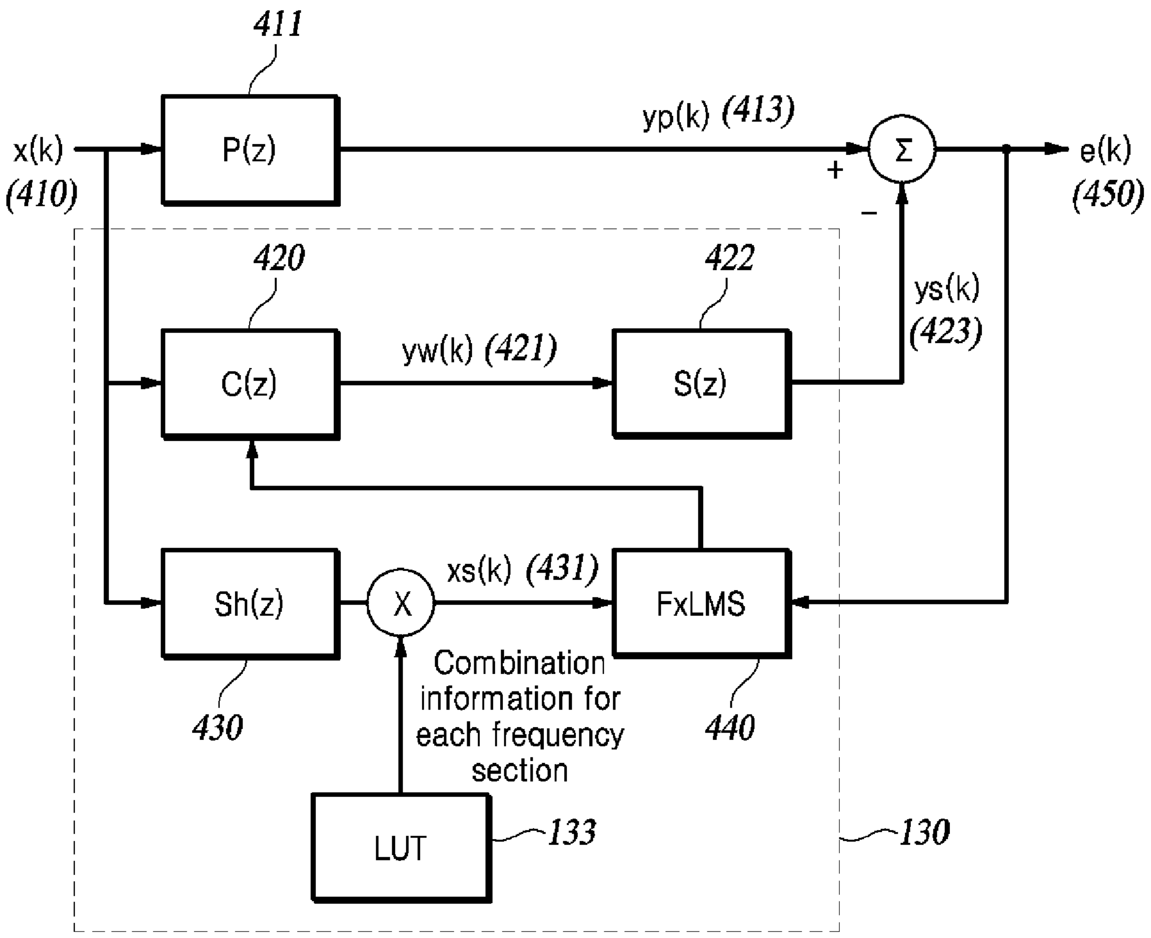
FIG. 4 is a schematic diagram illustrating part of the active noise control method of a vehicle according to the embodiment of the present disclosure.

FIG. 4 is a schematic diagram illustrating part of an active noise control method of a vehicle according to an embodiment of the present disclosure.

Referring to FIG. 4, the active noise control apparatus for a vehicle according to an embodiment of the present invention generates corrected noise on an active noise algorithm on the basis of the virtual reference signal 138.

A first path transfer function (P(z)) 411 is generated on the basis of a reference signal (x(k)) 410. The reference signal 410 includes noise information measured by the acceleration sensors 120.

After the reference signal 410 is transferred to the active noise control unit, the primary path transfer function 411 is formed between the acceleration sensors 120 and the noise collection unit 110. The primary path transfer function 411 generates primary path noise (yp(k)) 413.

Acoustic transfer characteristics of the primary path transfer function 411 may be derived from a relationship between the reference signal 410 and a correction noise 450. For example, the primary path transfer function 411 may be calculated from a frequency response function of x(k) which is the reference signal 410 and yp(k) which is the primary path noise 413. As sound transmission characteristics of the primary path transfer function 411, 'yp(k)/x(k)' may be used.

The primary path noise (yp(k)) 413 may be noise at a position to be controlled. For example, the primary path noise 413 represents noise at a position of an car of the occupant or noise at a position of the microphone. Here, the position of the microphone may be approximated to the position of the car of the occupant, which is an active noise control point.

A correlation coefficient (Sh(z)) 430 is a correlation coefficient of an FxLMS controller 420 estimated by a secondary path transfer function 422. That is, the correlation coefficient 430 is a correlation coefficient of a feedback signal generated by the FxLMS controller 420. The reference signal 410 received from the acceleration sensors 120 is input to the correlation coefficient 430 according to an embodiment of the present invention, and the correlation coefficient 430 is multiplied by the combination information for each frequency section previously stored in the lookup table 133, so that a virtual reference signal (xs(k)) 431 is generated. Here, the lookup table 133 includes combination information with the highest correlation among combination information for each frequency section previously stored on the basis of the state variables of the vehicle. The state variables of the vehicle may include, for example, a speed of the vehicle, an engine RPM of the vehicle, a surface condition of a road, a vibration of the vehicle, and a deceleration and acceleration of the vehicle. The calculated virtual reference signal 431 is input to a Filtered-x Least Mean Square (FxLMS) 440 at the same time as the correction noise 450 is output. The FxLMS 440 updates the controller (C(z)) 420 using the virtual reference signal 431 and the fed-back correction noise 450. The FxLMS controller (C(z)) 420 is updated from the FxLMS 440 and then generates noise (yw(k)) 421.

The secondary path transfer function (S(z)) 422 calculates an output value (ys(k)) 423 on the basis of the noise 421 fed back from the FxLMS controller 420. Here, the output value 423 may be an output value to which an adaptive filter has been applied.

Each element of the apparatus or method in accordance with the present invention may be implemented in hardware or software, or a combination of hardware and software. The functions of the respective elements may be implemented in software, and a microprocessor may be implemented to execute the software functions corresponding to the respective elements.

Various embodiments of systems and techniques described herein can be realized with digital electronic circuits, integrated circuits, field programmable gate arrays (FPGAs), application specific integrated circuits (ASICs), computer hardware, firmware, software, and/or combinations thereof. The various embodiments can include implementation with one or more computer programs that are executable on a programmable system. The programmable system includes at least one programmable processor, which may be a special purpose processor or a general purpose processor, coupled to receive and transmit data and instructions from and to a storage system, at least one input device, and at least one output device. Computer programs (also known as programs, software, software applications, or code) include instructions for a programmable processor and are stored in a "computer-readable recording medium."

The computer-readable recording medium may include all types of storage devices on which computer-readable data can be stored. The computer-readable recording medium may be a non-volatile or non-transitory medium such as a read-only memory (ROM), a random access memory (RAM), a compact disc ROM (CD-ROM), magnetic tape, a floppy disk, or an optical data storage device. In addition, the computer-readable recording medium may further include a transitory medium such as a data transmission medium. Furthermore, the computer-readable recording medium may be distributed over computer systems connected through a network, and computer-readable program code can be stored and executed in a distributive manner.

Although operations are illustrated in the flowcharts/timing charts in this specification as being sequentially performed, this is merely an exemplary description of the technical idea of one embodiment of the present disclosure. In other words, those skilled in the art to which one embodiment of the present disclosure belongs may appreciate that various modifications and changes can be made without departing from essential features of an embodiment of the present disclosure, that is, the sequence illustrated in the flowcharts/timing charts can be changed and one or more operations of the operations can be performed in parallel. Thus, flowcharts/timing charts are not limited to the temporal order.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand that the scope of the claimed invention is not to be limited by the above explicitly described embodiments but by the claims and equivalents thereof.

What is claimed is:

1. An active noise control method for a vehicle, comprising:

acquiring, from a lookup table, frequency section information corresponding to a current state of the vehicle, the lookup table storing information for each of a plurality of frequency sections of a plurality of acceleration sensors for each of a plurality of state variables of the vehicle;

generating a virtual reference signal from a plurality of reference signals of the plurality of acceleration sensors based on the frequency section information;

generating an active noise control signal based on the virtual reference signal and an error signal; and outputting an active noise control sound based on the active noise control signal, wherein the information stored in the lookup table includes information, for each of the plurality of frequency sections of the plurality of acceleration sensors, on a sum representing high correlation, according to the plurality of state variables of the vehicle.

2. The active noise control method of claim 1, wherein the plurality of state variables of the vehicle include at least one of a speed of the vehicle, an engine revolution-per-minute (RPM) of the vehicle, a surface condition of a road, a vibration of the vehicle, and a deceleration or acceleration of the vehicle.

3. The active noise control method of claim 1 wherein generating the virtual reference signal includes selecting a target error signal corresponding to the state variable of the vehicle from the information on the sum for each frequency section stored in the lookup table.

4. An active noise control apparatus for a vehicle comprising:

a noise collection unit configured to collect noise information using a plurality of noise collection apparatuses;

a plurality of acceleration sensors disposed on a path through which a vibration is transferred to the vehicle and configured to sense a vibration causing noise on a road surface;

an active noise control unit configured to generate a virtual reference signal using frequency section information corresponding to a current state of the vehicle based on information for each frequency section of the plurality of acceleration sensors for each of a plurality of state variables of the vehicle; and a noise output unit configured to output an active noise control sound generated by the active noise control unit, wherein the active noise control unit includes:

an active noise target area setting unit configured to set an active noise target area;

a lookup table (LUT) storing the information for each frequency section of the plurality of acceleration sensors in advance;

a target error signal estimation unit configured to estimate an error signal corresponding to the active noise target area set by the active noise target area setting unit by referring to the lookup table; and a control signal generation unit configured to generate an active noise control signal.

5. The active noise control apparatus of claim 4, wherein the information for each frequency section of the plurality of acceleration sensors includes information corresponding to the state variable of the vehicle for frequencies corresponding to an x-axis, a y-axis, and a z-axis of each of the plurality of acceleration sensors.

* * * * *